United States Patent
Yamaji (10) Patent No.: US 8,787,811 B2
(45) Date of Patent: Jul. 22, 2014

(54) LENTICULAR LENS SHEET MANUFACTURING APPARATUS

(75) Inventor: Hiroyuki Yamaji, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 332 days.

(21) Appl. No.: 13/269,704

(22) Filed: Oct. 10, 2011

(65) Prior Publication Data
US 2012/0107016 A1 May 3, 2012

(30) Foreign Application Priority Data

Oct. 27, 2010 (JP) ................. 2010-241549

(51) Int. Cl.
*G03G 15/08* (2006.01)
(52) U.S. Cl.
USPC .......................................... 399/341
(58) Field of Classification Search
USPC ........................... 399/341, 297, 336
See application file for complete search history.

(56) References Cited

U.S. PATENT DOCUMENTS

| 7,430,395 B2 * | 9/2008 | Iwaishi et al. | 399/336 |
| 2010/0209148 A1 * | 8/2010 | Hiramoto et al. | 399/297 |
| 2012/0008153 A1 | 1/2012 | Kunii et al. | |

FOREIGN PATENT DOCUMENTS

| JP | 2001-290006 A | 10/2001 |
| JP | 2008-026477 A | 2/2008 |
| JP | 2009-116011 A | 5/2009 |
| JP | 2009-223313 | 10/2009 |
| JP | 2012-022051 A | 2/2012 |
| JP | 2012-116139 A | 6/2012 |

* cited by examiner

*Primary Examiner* — Quana M Grainger
(74) *Attorney, Agent, or Firm* — Renner, Otto, Boisselle & Sklar, LLP (57) ABSTRACT

A lenticular lens sheet manufacturing apparatus includes a transparent toner layer forming section and a lens forming section. The transparent toner layer forming section includes a photoreceptor drum, a charging section and a exposure section that form an electrostatic latent image on the photoreceptor drum, a developing section that forms a transparent toner image, a transfer section that transfers the transparent toner image to one side of a transparent substrate, and a fixing section that heats the transparent toner image transferred to one side of the transparent substrate to fix the transparent toner image, thereby forming a transparent toner layer on one side of the transparent substrate. The lens forming section pressurizes under heating the transparent toner layer formed on one side of the transparent substrate to shape the layer into a concavo-convex shape, thereby forming a lens layer having a concavo-convex shape on one side of the transparent substrate.

4 Claims, 6 Drawing Sheets

LENTICULAR LENS SHEET MANUFACTURING APPARATUS

CROSS-REFERENCE TO RELATED APPLICATION

This application claims priority to Japanese Patent Application No. 2010-241549, which was filed on Oct. 27, 2010, the contents of which are incorporated herein by reference in its entirety.

BACKGROUND OF THE TECHNOLOGY

1. Field of the Technology

The present technology relates to an electrophotographic lenticular lens sheet manufacturing apparatus.

2. Description of the Related Art

An electrophotographic image forming apparatus is capable of forming a high-quality image with favorable reproducibility and operability at low cost. This is why the electrophotographic image forming apparatus has been widely used in a copier, a printer, a facsimile machine, a multifunction machine having two or more of these functions just stated, and the like machine.

Recording mediums used in an image forming apparatus of an electrophotographic system include lenticular lens sheets having a lens layer of a concavo-convex shape formed on one side in a thickness direction of a transparent substrate, in addition to recording sheets in which both sides in a thickness direction have a smooth surface, such as a paper sheet, a plastic sheet and an OHP sheet.

When an image is formed on a lenticular lens sheet by an image forming apparatus, a three-dimensional image and an image in which a two-dimensional image, but plural images are switched by changing a viewing angle, are expressed.

Japanese Unexamined Patent Publication JP-A 2008-26477 discloses a method for forming an image on a lenticular lens sheet. According to the technology disclosed in JP-A 2008-26477, image formation with a toner is conducted using a recording medium comprising a transparent substrate, a thermoplastic resin layer for forming a lens layer on one side of the transparent substrate and a thermoplastic resin layer for the image formation with a toner formed on other side thereof, and pressure is then applied under heating to the thermoplastic resin layer for forming a lens layer to shape the thermoplastic resin layer into a concavo-convex shape, thereby forming a lens layer.

That is, the technology disclosed in JP-A 2008-26477 is that a lens layer having a concavo-convex shape is formed using a preliminarily prepared recording medium having formed thereon a thermoplastic resin layer for forming a lens layer. Therefore, the technology uses a plurality of apparatuses, that is, an apparatus for forming a thermoplastic resin layer on a transparent substrate and an apparatus for forming a lens layer by shaping the thermoplastic resin layer into a concavo-convex shape. As a result, it does not say that the technology is convenient as an apparatus constitution for manufacturing a lenticular lens sheet.

Figure 7:
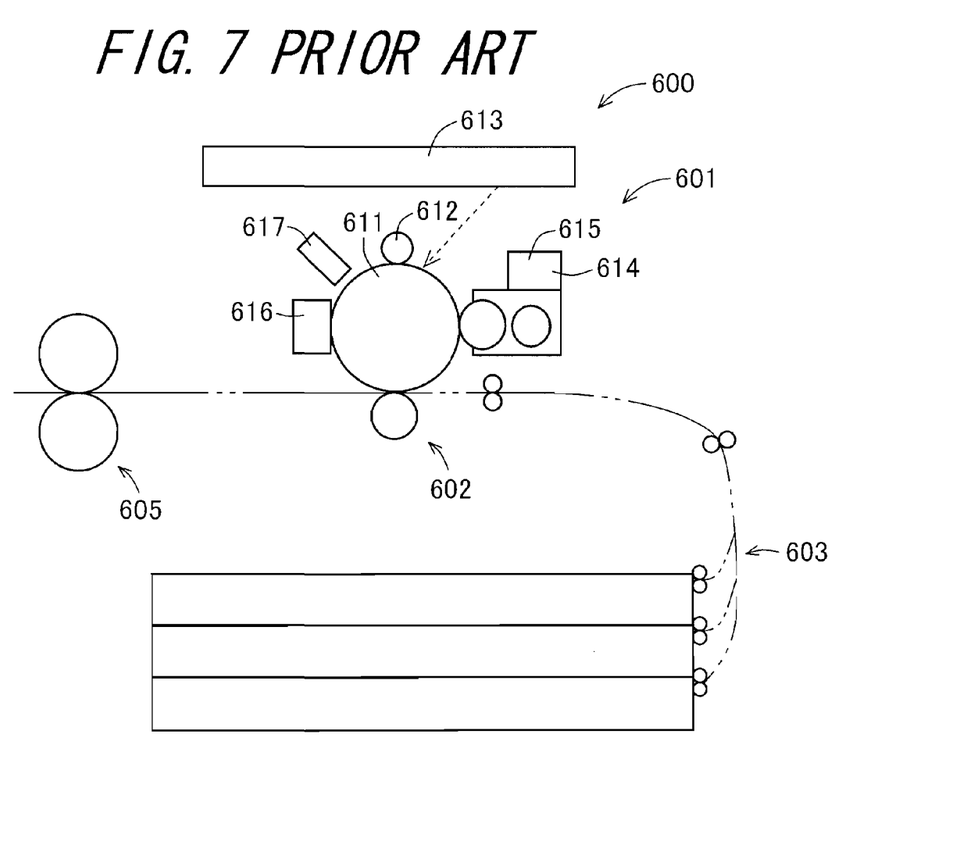
FIG. 7 is a view showing a constitution of a lenticular lens sheet manufacturing apparatus.

To overcome the above problem, an apparatus shown in FIG. 7 is considered as a lenticular lens sheet manufacturing apparatus that can manufacture a lenticular lens sheet in a single apparatus. FIG. 7 is a view showing a constitution of a lenticular lens sheet manufacturing apparatus 600.

The lenticular lens sheet manufacturing apparatus 600 shown in FIG. 7 is an apparatus for manufacturing a lenticular lens sheet comprising a transparent substrate and a lens layer having a concavo-convex shape, formed on one side in a thickness direction of the transparent substrate, in an electrophotographic system. The lenticular lens sheet manufacturing apparatus 600 comprises a transparent toner image forming section 601, a transfer section 602, a sheet feed section 603 and a lens forming section 605. The transparent toner image forming section 601 comprises a photoreceptor drum 611, a charging section 612, an exposure section 613, a developing section 614, a developer supply section 615, a drum cleaner 616 and a charge removing section 617.

In the lenticular lens sheet manufacturing apparatus 600, an electrostatic latent image is formed on the photoreceptor drum 611 by the charging section 612 and the exposure section 613, the electrostatic latent image is developed by the developing section 614 using a transparent toner to form a transparent toner image, the transparent toner is supplied to the developing section 614 by the developer supply section 615, residual transparent toner on the photoreceptor drum 611 is removed by the drum cleaner 616, and charge removal of the photoreceptor drum 611 is performed by the charge removing section 617.

The transparent substrate is fed to the transfer section 602 by the sheet feed section 603, a transparent toner image formed on the photoreceptor drum 611 is transferred to the one side of the transparent substrate by the transfer section 602, the transparent substrate having the transparent toner image transferred thereto is pressurized under heating to fix the transparent toner image to the transparent substrate, and at the same time, the transparent toner image is shaped into a concavo-convex shape, thereby forming a lens layer, by the lens forming section 605.

According to the lenticular lens sheet manufacturing apparatus 600 as shown in FIG. 7, a lenticular lens sheet comprising a transparent substrate having formed on the one side thereof a lens layer having a concavo-convex shape can be manufactured by a single apparatus, but it does not say that the lenticular lens sheet manufactured has good quality. The reason for this is as follows.

In the lenticular lens sheet manufacturing apparatus 600, the transparent substrate having a transparent toner image transferred thereto is pressurized under heating to fix the transparent toner image to the transparent substrate, and additionally the transparent toner image is shaped into a concavo-convex shape, thereby forming a lens layer, by the lens forming section 605. It is difficult to set the heating conditions in the lens forming section 605 such that a high quality lenticular lens sheet can be manufactured.

To form a lens layer, a surface of a member such as a roller of the lens forming section 605 for use in lens formation is processed into a shape according to a lens shape. In order that a transparent toner image is melted in a nip of the lens forming section 605 and the transparent toner image is shaped into a lens shape so as to fit to the shape of the roller member surface, the roller member is required to have a so-called hard roller structure that the surface does not have a rubber layer. For this reason, it is difficult to obtain a wide width of a nip.

To fix the transparent toner image transferred to the one side of the transparent substrate, the transparent toner image is required to heat at high temperature. In order to melt and fix the transparent toner image completely by a roller member of a hard roller structure having a narrow nip width in the lens forming section 605, the surface temperature of the roller member is required to be very high temperature. The transparent toner image thus heated at high temperature decreases its viscosity. As a result, hot offset resistance decreases, thereby surface smoothness of the lens layer is decreased.

To suppress occurrence of hot offset, heating temperature of the time of heating the transparent toner image should be decreased. However, in this case, adhesive strength of the lens layer to the transparent substrate is decreased, and for example, the lens layer separates when merely lightly touching with a finger.

That is, in the lenticular lens sheet manufacturing apparatus 600, the transparent substrate having a transparent toner image transferred thereto is pressurized under heating to fix the transparent toner image to the transparent substrate, and additionally the transparent image toner is shaped into a concavo-convex shape, thereby forming a lens layer, by the lens forming section 605. Therefore, the degree of freedom of temperature setting at the formation of the lens layer is low, and it is difficult to set the heating conditions in the lens forming section 605 such that a high quality lenticular lens sheet can be manufactured.

SUMMARY OF THE TECHNOLOGY

Accordingly, an object of the technology is to provide a lenticular lens sheet manufacturing apparatus, capable of manufacturing a lenticular lens sheet having excellent hot offset resistance and having sufficient adhesive strength of a lens layer to a transparent substrate in a single apparatus.

The technology provides a lenticular lens sheet manufacturing apparatus for manufacturing a lenticular lens sheet comprising a transparent substrate and a lens layer formed on one side of the transparent substrate and having a concavo-convex shape, the apparatus comprising:

a transparent toner layer forming section which forms a transparent toner layer of a transparent toner containing a binder resin on the one side of a transparent substrate, the transparent toner layer forming section comprising:
an image bearing member;
a latent image forming section which forms an electrostatic latent image on the image bearing member;
a developing section which develops the electrostatic latent image formed on the image bearing member with the transparent toner and forms a transparent toner image on the image bearing member;
a transfer section which transfers the transparent toner image formed on the image bearing member to the one side of the transparent substrate; and
a fixing section which heats the transparent toner image transferred to the one side of the transparent substrate to fix the transparent toner image, thereby forming a transparent toner layer on the one side of the transparent substrate; and
a lens forming section which pressurizes under heating the transparent toner layer formed on the one side of the transparent substrate to shape the transparent toner layer into a concavo-convex shape, thereby forming a lens layer having a concavo-convex shape on the one side of the transparent substrate.

The lenticular lens sheet manufacturing apparatus is an apparatus of manufacturing a lenticular lens sheet comprising a transparent substrate and a lens layer formed on one side of the transparent substrate and having a concavo-convex shape, in an electrophotographic system, and comprises a transparent toner layer forming section and a lens forming section. The transparent toner layer forming section comprises an image bearing member, a latent image forming section, a developing section, a transfer section, and a fixing section. The latent image forming section forms an electrostatic latent image on the image bearing member. The developing section develops the electrostatic latent image with a transparent toner and forms a transparent toner image on the image bearing member. The transfer section transfers the transparent toner image formed on the image bearing member to the one side of the transparent substrate. The fixing section heats the transparent toner image transferred to the one side of the transparent substrate to fix the transparent toner image, thereby forming a transparent toner layer on the one side of the transparent substrate. The lens forming section pressurizes under heating the transparent toner layer formed on the one side of the transparent substrate to shape the transparent toner layer into a concavo-convex shape, thereby forming a lens layer having a concavo-convex shape on the one side of the transparent substrate. The lenticular lens sheet manufacturing apparatus according to the technology is separately provided with the fixing section which forms the transparent toner layer on the one side of the transparent substrate, and the lens forming section which shapes the transparent toner layer into a concavo-convex shape, thereby forming a lens layer. Therefore, the degree of freedom of setting the heating conditions in the fixing section and the lens forming section can be improved, and a lenticular lens sheet having excellent hot offset resistance and sufficient adhesive strength of the lens layer to the transparent substrate can be manufactured in a single apparatus.

Further, it is preferable that the fixing section heats the transparent toner image transferred to the one side of the transparent substrate in a non-contact state and forms the transparent toner layer on the one side of the transparent substrate.

The fixing section heats the transparent toner image transferred to the one side of the transparent substrate in a non-contact state and forms the transparent toner layer on the one side of the transparent substrate. This can prevents occurrence of hot offset in the fixing section, thereby the heating temperature in the fixing section can be set to high value. Therefore, the fixing section can form a high quality transparent toner layer having a large thickness. As a result, the lenticular lens sheet manufacturing apparatus can manufacture a high quality lenticular lens sheet having formed thereon a lens layer having a large thickness.

Further, it is preferable that the lenticular lens sheet manufacturing apparatus comprises a plurality of the transparent toner layer forming sections, sequentially forms the transparent toner layers in each transparent toner layer forming section, and laminates a plurality of the transparent toner layers on the one side of the transparent substrate, thereby forming a transparent toner layer.

The lenticular lens sheet manufacturing apparatus comprises a plurality of the transparent toner layer forming sections, sequentially forms the transparent toner layers in each transparent toner layer forming section, and laminates a plurality of the transparent toner layers on the one side of the transparent substrate, thereby forming a transparent toner layer. This can form transparent toner layers having a relatively small thickness in the transparent toner layer forming sections, and can form a transparent toner layer having a large thickness by laminating these layers. Therefore, the heating temperature in the fixing section of each transparent toner layer forming section can be set to low value, thereby preventing occurrence of hot offset, and a high quality transparent toner layer having a large thickness can be formed. As a result, the lenticular lens sheet manufacturing apparatus can manufacture a high quality lenticular lens sheet having formed thereon a lens layer having a large thickness.

In a lenticular lens sheet having formed thereon a lens layer having a constant pitch between lenses and having a large thickness, that is, a lens layer having large height of a convex portion of a lens, the thickness of the transparent substrate can be made relatively small. This can reduce, for example, the load to a conveyance-related roller such as a conveying roller provided between the transparent toner layer forming section and the lens forming section. This makes it possible to form a lenticular lens sheet having formed thereon good lens layer over a long period of time.

Further, it is preferable that the plurality of the transparent toner layer forming sections are arranged in series.

In the lenticular lens manufacturing sheet apparatus, the plurality of the transparent toner layer forming sections are arranged in series. This arrangement sequentially forms the transparent toner layers in each transparent toner layer forming section, and laminates a plurality of the transparent toner layers on the one side of the transparent substrate, thereby forming a transparent toner layer.

BRIEF DESCRIPTION OF THE DRAWINGS

Other and further objects, features, and advantages will be more explicit from the following detailed description taken with reference to the drawings wherein.

DETAILED DESCRIPTION

Now referring to the drawings, preferred embodiments are described below.

Figure 1:
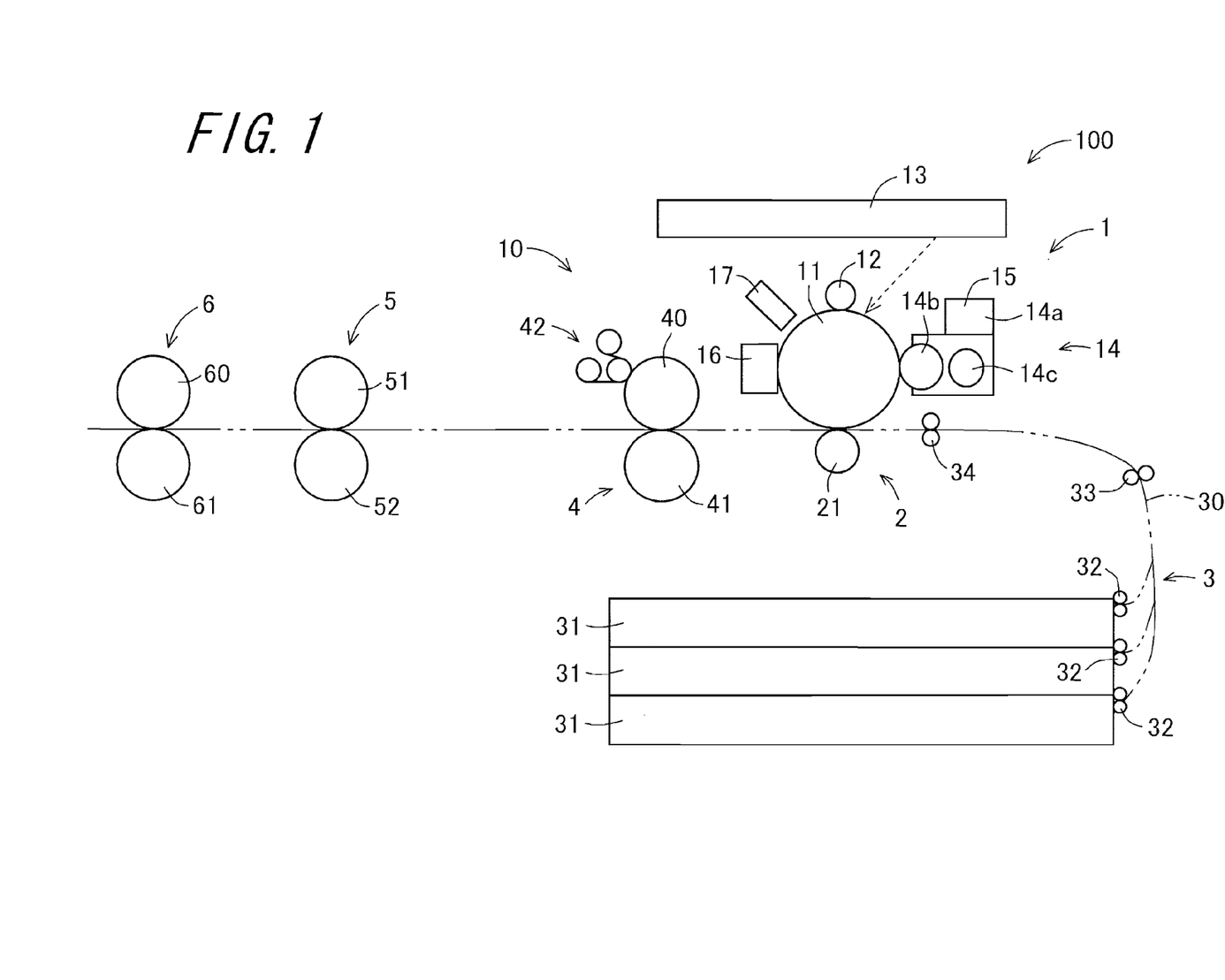
FIG. 1 is a view showing the constitution of a lenticular lens sheet manufacturing apparatus according to a first embodiment.

FIG. 1 is a view showing the constitution of an lenticular lens sheet manufacturing apparatus 100 according to a first embodiment. The lenticular lens sheet manufacturing apparatus 100 according to the present embodiment is an apparatus for manufacturing a lenticular lens sheet comprising a transparent substrate and a lens layer having a concavo-convex shape, formed on one side in a thickness direction of the transparent substrate in an electrophotographic system.

The lenticular lens sheet manufacturing apparatus 100 comprises a transparent toner layer forming section 10, a sheet feed section 3, a lens forming section 5, and a sheet discharge section 6.

The transparent toner layer forming section 10 forms a transparent toner layer constituted of a transparent toner containing a binder resin, on the one side of the transparent substrate. The transparent toner layer forming section 10 comprises a transparent toner image forming section 1, a transfer section 2 and a fixing section 4.

The transparent toner image forming section 1 comprises a photoreceptor drum 11 as an image bearing member, a charging section 12, an exposure section 13, a developing section 14, a developer supply section 15, a drum cleaner 16, and a charge removing section 17. In the lenticular lens sheet manufacturing apparatus 100 according to the present embodiment, a latent image forming section comprises the charging section 12 and the exposure section 13. The charging section 12, the developing section 14, the transfer section 2, the drum cleaner 16 and the charge removing section 17 are arranged in this order from the upstream side of a rotating direction of the photoreceptor drum 11 toward the downstream side thereof around the photoreceptor drum 11.

The photoreceptor drum 11 has a drum shape and is rotationally driven around an axis line thereof by a driving section (not shown). The photoreceptor drum 11 comprises a conductive substrate comprising, for example, aluminum, and a photosensitive layer provided on the surface of the conductive substrate. The conductive substrate can use cylindrical, columnar and sheet-like conductive substrates, and among them, a cylindrical conductive substrate can preferably be used. Examples of the photosensitive layer used include an organic photosensitive layer and an inorganic photosensitive layer.

Examples of the organic photosensitive layer include a laminate of a charge generating layer which is a resin layer containing a charge generating substance and a charge transport layer which is a resin layer containing a charge transport substance, and a resin layer containing a charge generating substance and a charge transport substance in one resin layer. Examples of the inorganic photosensitive layer include resin layers containing at least one selected from zinc oxide, selenium and amorphous silicon.

An undercoat layer may be present between the conductive substrate and the photosensitive layer. A surface layer (protective layer) for protecting the photosensitive layer may be provided on the surface of the photosensitive layer.

The charging section 12 is a member which charges the surface of the photoreceptor drum 11 in given polarity and potential. The charging section 12 is provided at a position facing the photoreceptor drum 11 along an axis line direction of the photoreceptor drum 11. The charging section 12 may be a charging device of any of a contact charging type and a non-contact charging type. In the case of the contact charging type, the charging section 12 is provided so as to come into contact with the surface of the photoreceptor drum 11, and in the case of the non-contact charging type, the charging section 12 is provided so as to separate from the surface of the photoreceptor drum 11. The charging section 12 can use a brush type charging device, a roller type charging device, a corona discharge device, an ion generation device and the like. The brush type charging device and the roller type charging device are a charging device of a contact charging type. The brush type charging device includes a device using a charging brush, and a device using a magnetic brush. The corona discharge device and the ion generation device are a charging device of a non-contact charging type. The corona discharge device includes a device using a wire-shaped discharge electrode, a device using a sawtooth discharge electrode and a device using a needle-shaped discharge electrode.

The exposure section 13 forms an electrostatic latent image corresponding to an image information on the surface of the photoreceptor drum 11 by irradiating the surface of the photoreceptor drum 11 in a charged state with laser light corresponding to the image information comprising digital signal. The exposure section 13 can use a semiconductor laser apparatus and the like.

The developing section 14 comprises a developer tank 14a, a development roller 14b and a stirring roller 14c. The developer tank 14a is a container-shaped member that stores a two-component developer containing a transparent toner and a carrier therein. The development roller 14b is a roller-shaped member provided so as to be rotatable around an axis line thereof. The development roller 14b is provided such that its part is projected outward from an opening formed on a surface facing the photoreceptor drum 11 of the developer tank 14a and is close to the surface of the photoreceptor drum 11.

The development roller 14b has a stationary magnet (not shown) therein, and bears a transparent toner on the surface of the development roller 14b by the stationary magnet. The development roller 14b feeds the borne transparent toner to the electrostatic latent image on the surface of the photoreceptor drum 11 in a proximal section (development nip region) between the development roller 14b and the photoreceptor drum 11, and forms a transparent toner image on the surface of the photoreceptor drum 11. The development roller 14b is rotationally driven in a direction reverse to the photoreceptor drum 11. Therefore, the surface of the development roller 14b and the surface of the photoreceptor drum 11 move in the same direction in the development nip region. The development roller 14b is connected to a power source (not shown), and direct current voltage (development voltage) is applied from the power source, thereby the transparent toner on the surface of the development roller 14b is smoothly fed to the electrostatic latent image.

The developing section 14 is not limited to a system of developing an electrostatic latent image formed on the surface of the photoreceptor drum 11 with a two-component developer containing a transparent toner and a carrier, and may be a type of developing the electrostatic latent image with a one-component developer consisting of a transparent toner. In the case where the developing section 14 is the type of developing the electrostatic latent image with a one-component developer consisting of a transparent toner, a roller such as a rubber roller or a metal roller free of a stationary magnet therein is used as the development roller 14b.

The stirring roller 14c is a screw-shaped member provided so as to be rotatable around an axis line thereof in the inside of the developer tank 14a. The stirring roller 14c is rotationally driven to feed the transparent toner in the developer tank 14a to the surface periphery of the developing roller 14b.

The developer supply section 15 is a container-shaped member that stores a transparent toner in the inside space thereof. The developer supply section 15 supplies the transparent toner to the developer tank 14a according to the consumption state of the transparent toner in the developing section 14.

The transparent toner used in the lenticular lens sheet manufacturing apparatus 100 of the present embodiment is described below. The transparent toner is a toner having translucency, and comprises the same constituents as the toner conventionally used in an electrophotographic image forming apparatus, except that a colorant is not contained. The transparent toner contains a binder resin, and further contains a release agent, a charge control agent and the like as necessary.

Examples of the binder resin used include a polystyrene resin, a resin comprising a homopolymer of a substitution product of styrene, a styrenic copolymer resin, a polyvinyl chloride resin, a polyvinyl acetate resin, a polyethylene resin, a polypropylene resin, a polyester resin, a polyurethane resin and a cyclic olefin resin. These binders resin may be used each alone or two or more of them may be used in combination.

Of these binder resins, binder resins having a softening temperature of from 100 to 150° C. and a glass transition temperature of from 50 to 80° C. are preferred from the standpoint of excellent storage stability and durability. A polyester resin having the above softening temperature and glass transition temperature is preferred, and a cyclic olefin resin is also preferred from the standpoint of transparency.

The release agent is not particularly limited, and can use, for example, a wax. The wax can use a wax generally used in this field, and examples the wax used include a polyethylene wax, a polypropylene wax, a paraffin wax and an ester wax.

The charge control agent is not particularly limited so long as it can charge the transparent toner or can control the charging. However, a charge control agent which does not give influence to transparency of the transparent toner is preferred. Examples of such a charge control agent include a nigrosine dye, a quaternary ammonium salt, a triphenylmethane derivative, a zinc salicylate complex, a zinc naphtholate complex, and a metal oxide of a benzylic acid derivative. These charge control agents may be used each alone or two or more of them may be used in combination.

The transparent toner can be produced according to the conventional production methods, and examples of the production method include a grinding method, a suspension polymerization method and a emulsion agglutination method.

The volume average particle size of the transparent toner is not particularly limited, but is preferably from 2 to 10 μm. In the case where the volume average particle size of the transparent toner is smaller than 2 μm, fluidity of the transparent toner is decreased. By the decrease of fluidity, feed, stirring and charging of the transparent toner become insufficient in the development operation in the developing section 14, and lack of toner amount and increase of reversely charged toner occur. This may give rise to the problem that a good image of the transparent toner cannot be formed. On the other hand, in the case where the volume average particle size of the transparent toner exceeds 10 μm, surface smoothness of a transparent toner layer formed on the one side of the transparent substrate may be decreased, and due to this, surface smoothness of a lens layer comprising the transparent toner layer shaped into a concavo-convex shape may be decreased.

External additive may externally be added to the transparent tone. The external additive is added to the transparent toner for the purpose of giving functions such as powder fluidity improvement, frictional chargeability improvement, heat resistance improvement, long term storage stability improvement, cleaning property improvement, and frictional property control of the surface of the photoreceptor drum 11. The external additive can use materials generally used in this field, and examples thereof include silica, alumina, titanium oxide, fine acryl powder and metal soap fine particles.

The carrier used as a two-component developer together with the transparent toner is not particularly limited, and can use materials conventionally used in this field. Examples of the carrier used include magnetic materials such as iron, nickel and cobalt, and magnetic oxides such as ferrite and magnetite. The carrier may be used as a resin-coated carrier in which the above magnetic materials and magnetic oxides are used as a core and a covering layer is formed on the surface of the core using a resin material. Whether either of the carrier free of the covering layer or the resin-coated carrier is used is appropriately selected according to the transparent toner component. These carriers may be used each alone or two or more of them may be used in combination. The volume average particle size of the carrier is not particularly limited, but is preferably from 30 to 100 μm in order to form a transparent toner layer having good surface smoothness. In the two-component developer, the transparent toner is preferably contained in a concentration of from 3 to 20% by weight based on the total amount of the two-component developer.

The drum cleaner 16 removes and recovers the transparent toner remained on the surface of the photoreceptor drum 11 after the transparent toner image formed on the surface of the photoreceptor drum 11 by the developing section 14 has been transferred to the transparent substrate by the transfer section 2.

The charge removing section 17 removes the charge of the photoreceptor drum 11 after the transparent toner has been removed by the drum cleaner 16. The charge removing section 17 can use an illumination member such as a lamp.

The transfer section 2 has a transfer roller 21 provided so as to be rotatable around an axis line thereof by a driving section (not shown). The transfer roller 21 is provided so as to come into pressure-contact with the photoreceptor drum 11. The pressure-contact portion between the transfer roller 21 and the photoreceptor drum 11 is called a transfer nip region. The transfer roller 21 transfers the transparent toner image formed on the surface of the photoreceptor drum 11 to the one side of the transparent substrate fed by a sheet feed section 3 described hereinafter, in the transfer nip region. In the transfer section 2, the transparent substrate having the transparent toner image transferred thereto in the transfer section 2 is conveyed to the fixing section 4.

The transfer roller 21 is, for example, a roller-shaped member comprising a metal-made shaft and a conductive layer covering the surface of the metal-made shaft. The metal-made shaft is formed of a metal such as stainless steel. The conductive layer is formed of a conductive elastomer. The conductive elastomer can use materials conventionally used in this field, and examples of the conductive elastomer include an ethylene-propylene-diene rubber (EPDM), a foamed EPDM, and a foamed polyurethane, each containing a conductive agent such as carbon black. The surface of the metal-made shaft may further be covered with a tube material such as PFA.

The transfer roller 21 is connected to a high pressure power source (not shown). High voltage having a polarity opposite to the charged polarity of the transparent toner image formed on the surface of the photoreceptor drum 11 is applied to the transfer roller 21 from the high pressure power source. Thus, the transparent toner image formed on the surface of the photoreceptor drum 11 is smoothly transferred to the one side of the transparent substrate.

The sheet feed section 3 comprises a sheet conveyance path 30, a plurality of cassettes 31 having the transparent substrate stored therein, pick-up rollers 32, conveying rollers 33, and registration rollers 34. The transparent substrate is a sheet having a thickness of from about 100 to 600 μm made of a resin such as PET (polyethylene terephthalate), and its size includes A4, B5, B4 and postcard size, defined in Japanese Industrial Standards (abbreviation: JIS).

The sheet conveyance path 30 is a path for sending the transparent substrate to be stored in the cassette 31 through the transfer section 2, the fixing section 4 and the lens forming section 5 to the sheet discharge section 6. The pickup rollers 32 are roller-shaped members for sending the transparent substrate in the cassette 31 sheet by sheet to the inside of the sheet conveyance path 30. The conveying rollers 33 are a pair of roll-shaped members provided so as to come into pressure-contact with each other, and convey the transparent substrate sent by the pickup roller 32 toward the resist roller 34. The registration rollers 34 are a pair of roll-shaped members provided so as to come into pressure-contact with each other. The registration rollers 34 feed the transparent substrate to the transfer nip region in synchronization with conveyance of the transparent toner image formed on the surface of the photoreceptor drum 11 to the transfer nip region.

Figure 2:
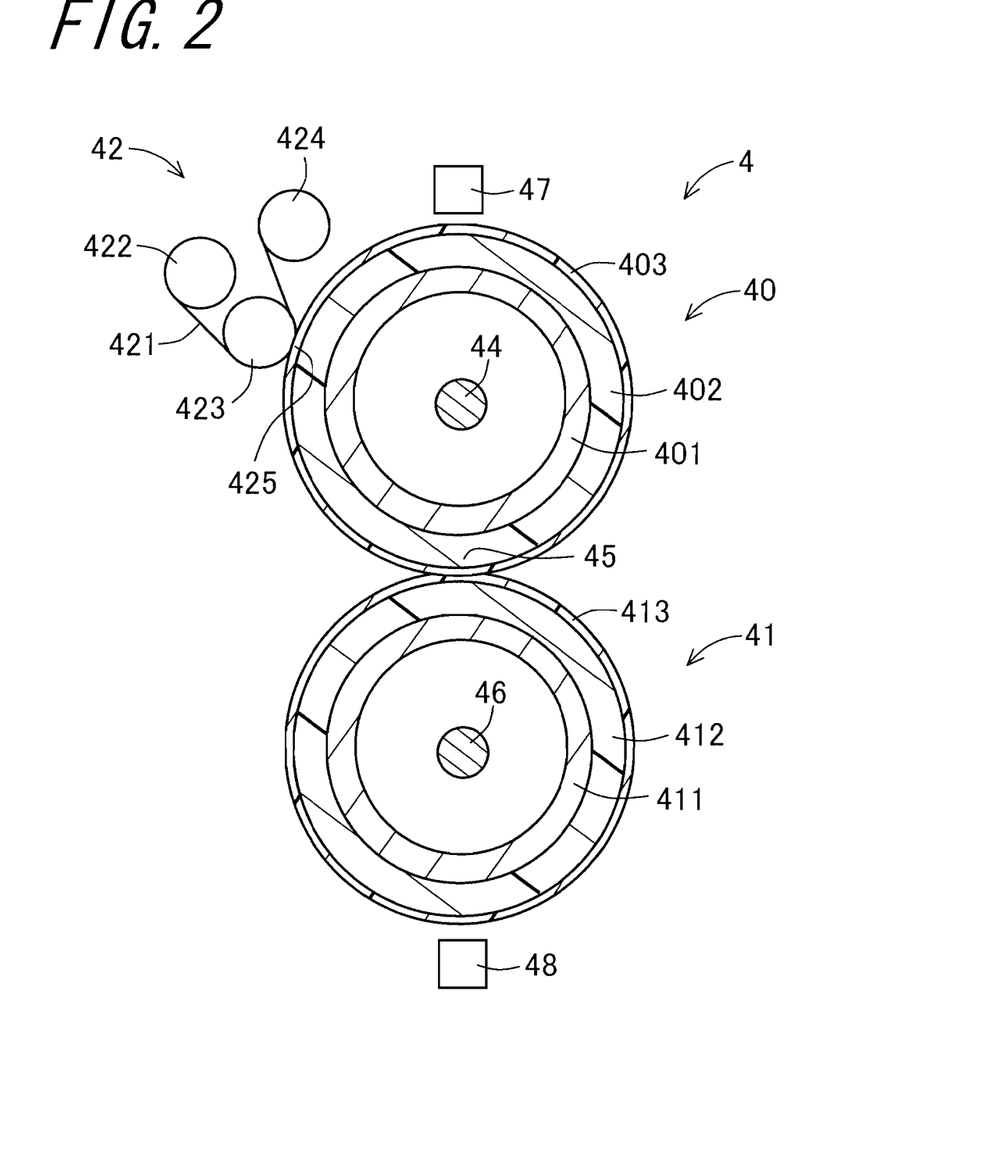
FIG. 2 is a view showing the constitution of a fixing section.

FIG. 2 is a view showing the constitution of the fixing section 4. The fixing section 4 comprises a fixing roller 40, a pressure roller 41, and a fixing cleaning section 42. The fixing roller 40 is a roller-shaped member provided so as to be rotatable around an axis line thereof, and is rotationally driven in a given peripheral velocity by a driving section (not shown). The fixing roller 40 heats, melts and fixes the transparent toner image transferred to the one side of the transparent substrate together with the pressure roller 41, and forms a transparent toner image on the one side of the transparent substrate.

The fixing roller 40 can use a roller-shaped member comprising a core metal 401, an elastomer layer 402 and a surface layer 403. The metal forming the core metal 401 can use a metal having high thermal conductivity, and can use aluminum, iron and the like. The shape of the core metal 401 includes a cylindrical shape and a columnar shape. The material constituting the elastomer layer 402 is not particularly limited so long as it has rubber elasticity. A material further having excellent heat resistance is preferred. Examples of the material include a silicone rubber, a fluorine rubber and a fluorosilicone rubber. Among them, a silicone rubber having particularly excellent rubber elasticity is preferred. The material constituting the surface layer 403 is not particularly limited so long as it has excellent heat resistance and durability, and has weak adhesion to the transparent toner. Examples of the material include fluorine resin materials such as PFA (copolymer of tetrafluoroethylene and perfluoroalkyl vinyl ether) and PTFE (polytetrafluoroethylene), and fluorine rubbers. In the present embodiment, the fixing roller 40 is a roller having an outer diameter of about 40 mm, comprising the iron-made core metal 401 having an outer diameter of 36 mm and a thickness of 2 mm, a silicone rubber layer having a thickness of 2 mm as the elastomer layer 402, formed on the surface of the iron-made core metal 401, and a PFA tube layer having a thickness of 40 μm provided as the surface layer 403.

The fixing roller 40 has an internal heater lamp 44 therein. In the present embodiment, a halogen lamp is used as the internal heater lamp 44. However, the internal heater lamp 44 is not limited to this, and can use an optional heating section for heating the fixing roller 40 from the inside. The internal heater lamp 44 is arranged along a central shaft (the same as a rotation axis) of the fixing roller 40.

The pressure roller 41 is provided so as to be rotatable in the state of coming into pressure-contact with the fixing roller 40 by a pressure mechanism (not shown). The pressure-contact portion between the fixing roller 40 and the pressure roller 41 is a fixing nip region 45. The pressure roller 41 drivenly rotates according to rotation of the fixing roller 40. The pressure roller 41 promotes to fix the transparent toner image to the transparent substrate by pressing a transparent toner in a molten state against the transparent substrate in heat-fixing the transparent toner image to the transparent substrate by the fixing roller 40.

The pressure roller 41 can use a roller-shaped member comprising a core metal 411, an elastomer layer 412 and a surface layer 413. The materials constituting the core metal 411, the elastomer later 412 and the surface layer 413 can use the same materials as the materials constituting the core metal 401, the elastomer later 402 and the surface layer 403 of the fixing roller 40. The shape of the core metal 411 is the same as the shape of the core metal 401 of the fixing roller 40. In the present embodiment, the pressure roller 41 is a roller having an outer diameter of about 40 mm comprising an iron-made core metal 411 having an outer diameter of 38 mm and a thickness of 1 mm, a silicone rubber layer having a thickness of 1 mm as the elastomer layer 412, formed on the surface of the iron-made core metal 411, and a PFA tube layer having a thickness of 40 μm provided as the surface layer 413.

The pressure roller 41 has an internal heater lamp 46 therein. The internal heater lamp 46 is to prevent rapid decease of a surface temperature of the pressure roller 41 due to the fact that heat transfers to the transparent substrate in fixing the transparent toner image, for the purpose of shortening the rise time until the formation of the transparent toner layer becomes possible from the power source "ON" of the lenticular lens sheet manufacturing apparatus 100. In the present embodiment, the internal heater lamp 46 uses a halogen lamp.

The fixing cleaning section 42 comprises a web 421, a sending roller 422, a web pressure-contact roller 423, and a take-up roller 424, and removes an offset toner and the like adhered to the surface of the fixing roller 40.

The web 421 is send toward the web pressure-contact roller 423 from the sending roller 422, is wound by the web pressure-contact roller 423, comes into pressure-contact with the surface of the fixing roller 40, and is then taken up by the take-up roller 424. The pressure-contact portion between the web 421 and the surface of the fixing roller 40 is a cleaning nip region 425.

The web 421 can use, for example, a heat-resistant non-woven fabric. Although the heat-resistant non-woven fabric is not particularly limited, the heat-resistant non-woven fabric includes a non-woven fabric comprising an aromatic polyamide fiber and a polyester fiber which softens at high temperature, and having both appropriate flexibility and mechanical strength. Such a heat-resistant non-woven fabric is commercially available, and examples thereof include NOMEX (registered trademark) and HIMELON (trade name). Although the thickness of the web 421 is not particularly limited, the thickness is preferably from 30 to 100 µm. In the present embodiment, the web 421 used has a thickness of 40 µm. The web 421 can be impregnated with an oil having release effect. The oil can use oils conventionally used in this field, and examples of the oil include silicone oils such as a dimethyl silicone oil, an amino-modified silicone oil, a mercapto-modified silicone oil and a fluorine-modified silicone oil. In the present embodiment, the web 421 can use a web impregnated with a silicone oil having a viscosity of about 0.01 m$^2$/s (10,000 centistokes, 25° C.).

The sending roller 422 is supported so as to be drivenly rotatable around an axis line thereof, and winds and holds the web 421 on the surface thereof. In the present embodiment, the sending roller 422 is constituted so as to driven-rotate in a counterclockwise direction and send the web 421.

The web pressure-contact roller 423 is a roller-shaped member in which both ends in an axis line direction are supported by bearings (not shown) so as to be drivenly rotatable. The web pressure-contact roller 423 is provided so as to come into pressure-contact with the surface of the fixing roller 40 through the web 421 by a pressing section such as a spring member. The web pressure-contact roller 423 drivenly rotates at the time of take-up operation of the web 421 by the take-up roller 424. The web pressure-contact roller 423 uses a roller-shaped member comprising a metal-made core metal, and an elastomer layer formed on the surface of the metal-made core metal. Examples of the elastic material constituting the elastic layer include a heat-resistant rubber such as a silicone rubber, and its foam. Surface hardness of the elastic layer is not particularly limited, and the surface hardness is preferably from 20° to 30° (Asker-C, Asker-C hardness). Pressing force against the fixing roller 40 is preferably from 3793.6 Pa (0.039 kgf/cm$^2$) to 18967.9 Pa (0.19 kgf/cm$^2$).

The length in an axis line direction of the web pressure-contact roller 423 should be larger than the greatest width of the transparent toner layer to be formed in the lenticular lens sheet manufacturing apparatus 100. The width (cleaning nip width) of the cleaning nip region 425 greatly affects the cleaning performance of the fixing cleaning section 42. Therefore, the width is preferably set to an appropriate range. The cleaning nip width is mainly determined by press force of the web pressure-contact roller 423 against the fixing roller 40, a roller diameter of the web pressure-contact roller 423, and the like. In the present embodiment, the width in an axis line direction of the web pressure-contact roller 423 is 310 mm which is longer than the greatest width of the transparent toner layer, and the roller diameter is 20 mm.

The take-up roller 424 is provided so as to be rotatable around an axis line thereof by a driving section (not shown), and takes up the web 421 after coming into contact with the fixing roller 40. The web 421 is sent from the sending roller 422 by rotation-driving of the take-up roller 424, and cleaning operation is initiated.

The operation of the fixing cleaning section 42 is controlled by a control section (not shown). The control section sends a control signal initiating the cleaning operation to a driving section for rotationally driving the take-up roller 424 (herein, a motor provided in a main body of the lenticular lens sheet manufacturing apparatus 100) in the case where the number of transparent substrates having passed through the fixing nip region 45 or the number of rotation of the fixing roller 40 exceeds a given threshold. The driving section having been received the control signal rotationally drives the take-up roller 424, and takes up a certain amount of the web 421. By this take-up, the web 421 is sent from the sending roller 422. The web 421 sent takes in offset toner and the like on the surface of the fixing roller 40 and cleans the surface. Although the operation example that the web 421 is intermittently taken up by the take-up roller 424 is shown, the operation is not limited to this example, and the web 421 may be continuously taken up in conformity with the timing that the transparent substrate passes through the fixing nip region 45.

In the present embodiment, a fixing roller side thermistor 47 is provided so as to be close to the fixing roller 40. The fixing roller side thermistor 47 detects a surface temperature of the fixing roller 40. The detection result by the fixing roller side thermistor 47 is inputted in a control section. The control section judges whether or not the surface temperature of the fixing roller 40 is within a range of a given preset temperature (fixing temperature). In the case where the surface temperature of the fixing roller 40 is lower than the preset range of a given fixing temperature, the control section sends a control signal to a power source connected to the internal heater lamp 44, and electric power is supplied to the internal heater lamp 44 to promote generation of heat. In the case where the surface temperature of the fixing roller 40 is higher than the preset range of a given fixing temperature, the control section sends a control signal to a power source connected to the internal heater lamp 44, and stops the supply of electric power to the internal heater lamp 44.

In the present embodiment, a pressure roller side thermistor 48 is provided so as to be close to the pressure roller 41. The pressure roller side thermistor 48 detects a surface temperature of the pressure roller 41. The detection result by the pressure roller side thermistor 48 is inputted in the control section. The control section judges whether or not the surface temperature of the pressure roller 41 is within a range of the given preset temperature (fixing temperature), based on the detection result by the pressure roller side thermistor 48. In the case where the surface temperature of the pressure roller 41 is lower than the preset range of a given fixing temperature, the control section sends a control signal to a power source connected to an internal heater lamp 46, and electric power is supplied to the internal heater lamp 46 to promote generation of heat. In the case where the surface temperature of the pressure roller 41 is higher than the preset range of a given fixing temperature, the control section sends a control signal to a power source connected to the internal heater lamp 46, and stops the supply of electric power to the internal heater lamp 46.

In the fixing section 4, the fixing roller 40 and the pressure roller 41 are heated so as to become the respective preset temperatures, thermistors 47 and 48 provided near the fixing roller 40 and the pressure roller 41, respectively, detect that the fixing roller 40 and the pressure roller 41 have reached the preset temperatures, and the detection results are inputted in the control section. The control section sends a control signal to a driving section for rotation-driving the fixing roller 40, and rotationally drives the fixing roller 40. As a result, the pressure roller 41 is driven-rotated. The transparent substrate having a transparent toner image formed thereon is conveyed to the fixing nip region 45 from the transfer section 2 in this state. In passing through the fixing nip region 45, the transparent toner image is pressurized under heating to fix the image, and a transparent toner layer is formed on the one side of the transparent substrate. In the present embodiment, the transparent toner layer formed on the one side of the transparent substrate preferably has a thickness of from 20 to 40 μm.

The surface temperatures of the fixing roller 40 and the pressure roller 41 are set to a temperature range 10 to 80° C. higher than the softening temperature of the binder resin constituting the transparent toner, and preferably a temperature of from 180 to 200° C.

The following test was conducted to determine the preferred range of a peripheral velocity at the time of rotation-driving the fixing roller 40.

(Test 1)

A transparent toner layer having a thickness of 20 μm was formed on the one side of a transparent substrate by changing surface temperatures of the fixing roller 40 and the pressure roller 41 and a peripheral velocity of the fixing roller 40.

[Two-Component Developer]
<Transparent Toner>
Binder resin: Cyclic olefin resin (softening temperature: 140° C.), 94.5 parts by weight
Charge control agent: Metal oxide of benzyl acid derivative, 0.5 part by weight
Release agent: Polyethylene wax, 5 parts by weight
<External Additive>
Silica: 1 part by weight based on 100 parts by weight of a transparent toner
Titanium oxide: 1.5 parts by weight based on 100 parts by weight of a transparent toner
<Carrier>
Ferrite carrier was added such that a concentration of a transparent toner in a two-component developer becomes 8% by weight.

[Transparent Substrate]
An A4-size PET sheet having a thickness of 550 μm was used.

[Fixing Section]
<Fixing Roller>
A roller having an outer diameter of about 40 mm comprising an iron-made core metal 401 having an outer diameter of 36 mm and a thickness of 2 mm, a silicone rubber layer having a thickness of 2 mm as an elastomer layer 402, formed on the core metal 401, and a PFA tube layer having a thickness of 40 μm as a surface layer 403, formed on the silicone rubber layer, was used as the fixing roller 40.

<Pressure Roller>
A roller having an outer diameter of about 40 mm comprising an iron-made core metal 411 having an outer diameter of 38 mm and a thickness of 1 mm, a silicone rubber layer having a thickness of 1 mm as an elastomer layer 412, formed on the core metal 411, and a PFA tube layer having a thickness of 40 μm as a surface layer 413, formed on the silicone rubber layer, was used as the pressure roller 41. A pressure-contact load of the pressure roller 41 against the fixing roller 40 was 600N. A nip width in this case was about 6 mm.

[Evaluation]
The following evaluations were conducted on the transparent toner layer formed on the one side of the transparent substrate, and fixability of the transparent toner layer was confirmed. The evaluation results are shown in Table 1.

<Fixing Evaluation>
In the transparent toner layer after fixing, formed on the one side of the transparent substrate, generation status of poor fixing and generation status of hot offset were visually confirmed. In the case where poor fixing and hot offset were not generated, it was judged that the fixability of the transparent toner layer is "Good". In the case where poor fixing or hot offset was generated, it was judged that the fixability of the transparent toner layer is "Poor".

TABLE 1

| Surface temperatures (T1) of fixing roller and pressure roller (° C.) | Peripheral velocity (V1) of fixing roller (mm/sec) | T1/V1 | Fixability of transparent toner layer |
|---|---|---|---|
| 180 | 15 | 12.0 | Good |
|  | 30 | 6.0 | Poor |
|  | 60 | 3.0 | Poor |
| 200 | 15 | 13.3 | Poor |
|  | 30 | 6.7 | Good |
|  | 60 | 3.3 | Poor |

From the results of Table 1, in the case where the surface temperature of the fixing roller 40 and the pressure roller 41 is T1 (° C.) and the peripheral velocity of the fixing roller 40 is V1 (mm/sec), when T1/V1 is satisfied with the range of from 6.7 to 12.0, the generation of offset can be suppressed, and additionally, adhesive strength of the transparent toner layer to the transparent substrate can sufficiently be obtained.

Figure 3:
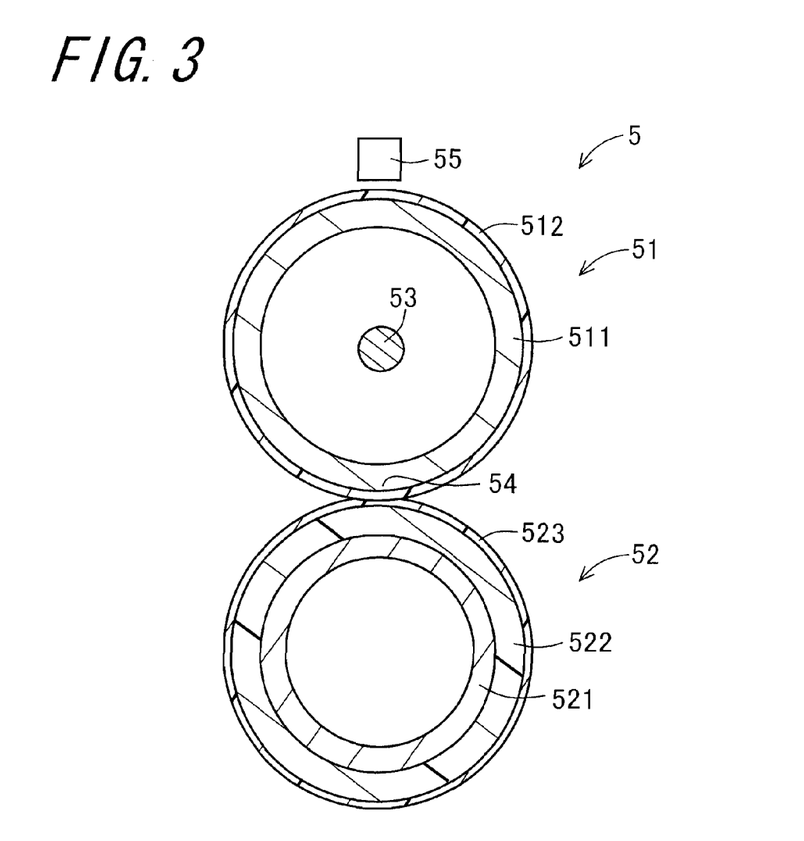
FIG. 3 is a view showing the constitution of a lens forming section.
Figure 4:
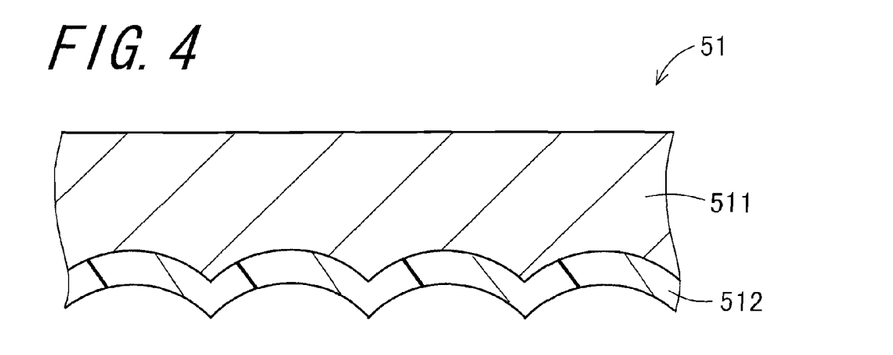
FIG. 4 is an enlarge view showing a major portion of a lens forming roller.

The transparent substrate having the transparent toner layer formed thereon in the fixing section 4 is conveyed to the lens forming section 5. FIG. 3 is a view showing the constitution of the lens forming section 5. FIG. 4 is an enlarge view showing a major portion of a lens forming roller 51.

The lens forming section 5 pressurizes under heating the transparent toner layer formed on the one side of the transparent substrate to shape the transparent toner layer into a concavo-convex shape to form a lens layer having a concavo-convex shape on the one side of the transparent substrate. The lens forming section 5 comprises a lens forming roller 51 and a lens forming pressure roller 52.

The lens forming roller 51 comes into contact with the one side of the transparent substrate to be conveyed to the lens forming section 5, on which the transparent toner layer is formed. The lens forming roller 51 is a roller-shaped member provided so as to be rotatable around an axis line thereof, and is rotationally driven in a given peripheral velocity by a driving section (not shown). The lens forming roller 51 shapes the transparent toner layer formed on the one side of the transparent substrate into a concavo-convex shape together with the lens forming pressure roller 52, thereby forming a lens layer having a concavo-convex shape on the one side of the transparent substrate.

The lens forming roller 51 comprises a core metal 511 and a release layer 512. Examples of the material constituting the core metal 511 include aluminum, iron and stainless steel. The core metal 511 has a straight cylindrical shape, and a drawing structure may be present or may not be present at both ends in an axis line direction of the core metal 511. Many concave grooves are formed on the surface of the core metal 511 as shown in FIG. 4 such that the transparent toner layer formed on the one side of the transparent substrate can be shaped into a concavo-convex shape. The grooves may be formed in an axis line direction of the lens forming roller 51 or may be formed along a peripheral direction thereof. A processing method of the groove includes mechanical processing by a metal-made bite and processing by laser. The groove shape of the lens forming roller 51 is appropriately set so as to obtain a desired thickness of the lens layer.

The release layer 512 is a layer covered on the surface of the core metal 511 and secures releasability of the transparent toner. Examples of the material constituting the release layer 512 include fluorine resin materials such as PFA (a copolymer of tetrafluoroethylene and perfluoroalkyl vinyl ether) and PTFE (polytetrafluoroethylene). Alternatively, DLC (diamond-like carbon) material containing these fluorine resins may be used. The release layer 512 has a thickness of preferably from about 10 nm to 30 μm. Where the thickness of the release layer 512 is extremely small, durability becomes problem. Where the thickness is too large, the groves of the core metal 511 are embedded, thereby a groove shape is greatly changed. As a result, lens shaping may not be made well.

In place of use of the release layer 512, a release agent such as a silicone oil may be applied to the surface of the core metal 511 in order to secure releasability of the transparent toner. Furthermore, a silicone oil may be applied while forming the release layer 512. The silicone oil that can be used has a viscosity of from about 1000 to 10000 CS.

As the mechanism that performs cleaning of the transparent toner and the like adhered to the surface of the lens forming roller 51, a cleaning mechanism such as cleaning web may be provided.

In place of use of the roller-shaped lens forming roller 51, a belt-shaped lens forming roller may be used. By using the belt-shaped lens forming roller, heat capacity can be decreased, and this makes it possible to shorten warm-up time. In the present embodiment, the lens forming roller 51 used is a roller comprising an aluminum-made core metal 511 having an outer diameter of 40 mm, a thickness of 2 mm and a body length (length in an axis direction) of 315 mm, the surface of which being mechanically processed to form grooves having a pitch of 254 μm and a depth of 30 μm at a width of 300 mm in a roller peripheral direction, and a fluorine resin coat layer having a thickness of 50 nm as the release layer 512, provided on the core metal 511.

The lens forming roller 51 has the internal heater lamp 53 therein. In the present embodiment, a halogen lamp is used as the internal heater lamp 53. However, the internal heater lamp is not limited to a halogen lamp, and optional heating section which heats the lens forming roller 51 from the inside can be used. The internal heater lamp 53 is arranged along a central axis (the same as a rotation axis) of the lens forming roller 51.

The lens forming pressure roller 52 comes into contact with other surface side opposite the side on which the transparent toner layer of the transparent substrate conveyed to the lens forming section 5 is formed. The lens forming pressure roller 52 is provided so as to be rotatable in the state of coming into pressure-contact with the lens forming roller 51 by a pressure mechanism (not shown). The pressure-contact portion between the lens forming roller 51 and the lens forming pressure roller 52 constitutes the lens forming nip region 54. Ball bearings are attached to both ends in an axis line direction of the lens forming pressure roller 52, and the lens forming pressure roller 52 drivenly rotates according to rotation of the lens forming roller 51. The lens forming pressure roller 52 promotes to shape the transparent toner layer into a concavo-convex shape by pressing the transparent toner layer to the transparent substrate in heat-shaping the transparent toner layer into a concavo-convex shape by the lens forming roller 51. The lens forming pressure roller 52 presses the lens forming roller 51 with a pressing force uniform in an axis line direction and having a total load of 400N by a pressure mechanism.

The lens forming pressure roller 52 can use a roller-shaped member comprising a core metal 521, an elastomer layer 522 and a release layer 523. Examples of the material constituting the core metal 521 include aluminum, iron and stainless steel. The core metal 521 has a straight cylindrical shape, and a drawing structure may be present or may not be present at both ends in an axis line direction of the core metal 521.

The elastomer layer 522 is provided to enlarge the lens forming nip region 54 formed by the lens forming roller 51 and the lens forming pressure roller 52, and is provided on the outer periphery of the core metal 521. The material constituting the elastomer layer 522 can use a material having rubber elasticity, and preferably a material having rubber elasticity and excellent heat resistance. Examples of the material include a silicone rubber, a fluorine rubber and a fluorosilicone rubber. These materials may be used as their foams. Silicone rubber having excellent heat resistance is particularly preferred.

The release layer 523 is provided on the outer periphery of the elastomer layer 522. The material constituting the release layer 523 can use a material having excellent heat resistance and durability, and having weak adhesive strength to the transparent toner. Specific examples of the material constituting the release layer 523 include fluorine resins such as PFA (a copolymer of tetrafluruoroethylene and perfluoroalkyl vinyl ether) and PTFE (polytetrafluoroethylene), and fluorine rubbers. When PFA and PTFE are used as the release layer 523, a tube comprising these materials may cover the elastomer layer 522 or these materials may be applied to the elastomer layer 522. The release layer 523 preferably has a thickness of from 10 to 50 μm.

In the present embodiment, the lens forming pressure roller 52 used is a roller having an outer diameter of about 40 mm comprising an iron-made core metal 521 free of a drawing structure and having an outer diameter of 29.76 mm, an inner diameter of 23.76 mm and a thickness of 3 mm, a silicone rubber (JIS-A Hardness: 30 degrees) layer having a thickness of 5 mm as the elastomer layer 522, formed on the core metal 521, and a PFA tube layer having a thickness of 50 μm as the release layer 523, provided on the elastomer layer 522. The lens forming pressure roller 52 has a length in an axis line direction of the core metal 521 of 313 mm and a length in an axis line direction of the elastomer layer 522 of 312 mm.

In the present embodiment, a lens forming roller side thermistor 55 is provided so as to be close to the lens forming roller 51. The lens forming roller side thermistor 55 detects a surface temperature of the lens forming roller 51. The detection result by the lens forming roller side thermistor 55 is inputted in a control section. The control section judges whether or not the surface temperature of the lens forming roller 51 is in a range of a given preset temperature (lens forming temperature) based on the detection result of the lens forming roller side thermistor 55. When the surface temperature of the lens forming roller 51 is lower than the preset range of the given lens forming temperature, the control section sends a control signal to a power source connected to the internal heater lamp 53, and supplies electric power to the internal heater lamp 53 to promote generation of heat. When the surface temperature of the lens forming roller 51 is higher than the preset range of the given lens forming temperature, the control section sends a control signal to a power source connected to the internal heater lamp 53, and stops supply of electric power to the internal heater lamp 53.

In the lens forming section 5, the lens forming roller 51 is heated so as to become a given lens forming temperature, and the lens forming roller side thermistor 55 provided near the lens forming roller 51 detects that the surface temperature of the lens forming roller has reached a given lens forming temperature, and the detection result is inputted in the control section. The control section sends a control signal to a driving section which rotation-drives the lens forming roller 51, and rotation-drives the lens forming roller 51. According to this driving, the lens forming pressure roller 52 drivenly rotates. In this state, the transparent substrate having the transparent toner layer formed thereon is conveyed to the lens forming nip region 54 from the fixing section 4. In passing through the lens forming nip region 54, the transparent toner layer is pressurized under heating to shape the layer into a concavo-convex shape, and a lens layer is formed on the one side of the transparent substrate.

The surface temperature of the lens forming roller 51 is set to a temperature range 0 to 80° C. higher than the softening temperature of the binder resin constituting the transparent toner, and preferably from 140 to 200° C.

The following test was conducted to determine a preferred range of a peripheral velocity at the time of rotation-driving the lens forming roller 51.

(Test 2)

A transparent toner layer having a thickness of about 20 μm was formed on the one side of a transparent substrate by changing a surface temperature and a peripheral velocity of the lens forming roller 51, and a lens having a thickness of about 30 μm was formed to the transparent toner layer by the lens forming roller 51. The conditions for forming the transparent toner layer on the one side of the transparent substrate were that the surface temperature of the fixing roller 40 is 200° C. and the peripheral velocity is 30 mm/sec, in Test 1 above.

[Lens Forming Section]
<Lens Forming Roller>

A roller comprising an aluminum-made core metal 511 having an outer diameter of 40 mm, a thickness of 2 mm and a straight body length (length in an axis line direction) of 315 mm, the surface of which having been mechanically processes to form grooves having a pitch of 254 μm and a depth of 30 μm at a width of 300 mm in a roller circumferential direction, and a fluorine resin coat layer having a thickness of 50 nm as the release layer 512, formed on the core metal was used as the lens forming roller 51.

<Lens Forming Pressure Roller>

A roller having an outer diameter of about 40 mm comprising an iron-made core metal 521 free of a drawing structure, having an outer diameter of 29.76 mm, an inner diameter of 23.76 mm and a thickness of 3 mm, a silicone rubber (JIS-A Hardness: 30 degrees) layer having a thickness of 5 mm as the elastomer layer 522, formed on the core metal, and a PFA tube layer having a thickness of 50 μm as the release layer 523, formed on the elastomer layer was used as the lens forming pressure roller 52. The lens forming pressure roller 52 has a length in an axis line direction of the core metal 521 of 313 mm and a length in an axis line direction of the elastomer layer 522 of 312 mm. A pressure-contact load of the lens forming pressure roller 52 to the lens forming roller 51 was 400N. A nip width in this case was about 2 mm.

[Evaluation]

The lens layer formed on the one side of the transparent substrate was evaluated as follows, and surface smoothness of the lens layer was confirmed. The evaluation results are shown in Table 2.

<Surface Smoothness Evaluation>

A 3D evaluation image corresponding to a pitch between lenses of 254 μm was prepared, and superposed on a lenticular lens sheet prepared, and lens forming state was visually evaluated. The evaluation standards are as follows.

Good: Good lens layer was formed, and good 3D image could be confirmed.

Fair: 3D image could be confirmed with substantially no problem, but points on which 3D reproducibility was decreased were confirmed in a very small part due to poor melting of a transparent toner or hot offset.

Poor: 3D image could not be reproduced over the entire sheet due to hot offset or poor melting of transparent toner.

TABLE 2

| Surface temperature (T2) of lens forming roller (° C.) | Peripheral velocity (V2) of lens forming roller (mm/sec) | T2/V2 | Surface smoothness of lens layer |
|---|---|---|---|
| 140 | 15 | 9.3 | Fair |
|  | 30 | 4.7 | Fair |
|  | 60 | 2.3 | Poor |
| 160 | 15 | 10.7 | Good |
|  | 30 | 5.3 | Fair |
|  | 60 | 2.7 | Poor |
| 180 | 15 | 12.0 | Poor |
|  | 30 | 6.0 | Good |
|  | 60 | 3.0 | Poor |
| 200 | 15 | 13.3 | Poor |
|  | 30 | 6.7 | Fair |
|  | 60 | 3.3 | Good |

From the results of Table 2, in the case where the surface temperature of the lens forming roller 51 is T2 (° C.) and the peripheral velocity of the lens forming roller 51 id V2 (mm/sec), when T2/V2 is satisfied with the range of from 3.3 to 10.7, a high quality lens layer having small surface roughness and excellent surface smoothness can be formed.

The lenticular lens sheet in which a lens layer was formed on the one side of the transparent substrate in the lens forming section 5 is conveyed to a sheet discharge section 6. The sheet discharge section 6 comprises a pair of discharge rollers 60 and 61 which come into pressure-contact with each other. The lenticular lens sheet is passed through a pressure-contact portion of a pair of the discharge rollers 60 and 61 and discharged outside an apparatus.

The lenticular lens sheet manufacturing apparatus 100 of the present embodiment as above is that the fixing section 4 which forms the transparent toner layer on the one side of the transparent substrate and the lens forming section 5 which forms a lens layer by shaping the transparent toner layer into a concavo-convex shape are separately provided. As a result, the degree of freedom of setting the heating conditions in the fixing section 4 and the lens forming section 5 can be improved, and a lenticular lens sheet having excellent hot offset resistance and sufficient adhesive strength of the lens layer to the transparent substrate can be manufactured by a single apparatus.

Figure 5:
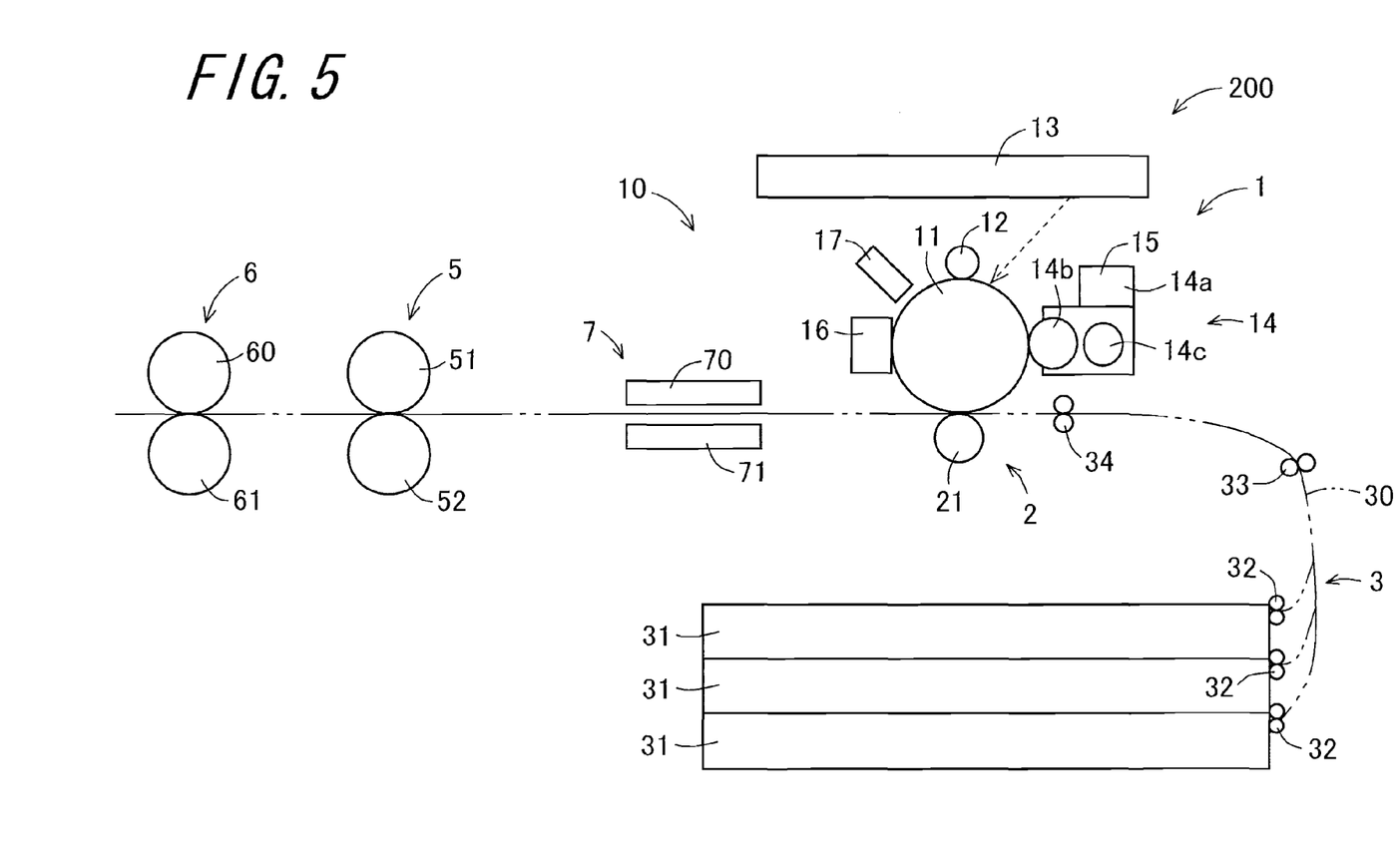
FIG. 5 is a view showing the constitution of a lenticular lens sheet manufacturing apparatus according to a second embodiment.

FIG. 5 is a view showing the constitution of a lenticular lens sheet manufacturing apparatus 200 according to a second embodiment. The lenticular lens sheet manufacturing apparatus 200 of the present embodiment is similar to the above-described lenticular lens sheet manufacturing apparatus 100 of the first embodiment, and the corresponding parts are denoted by the same reference numerals and signs, and the description thereof is omitted. The lenticular lens sheet manufacturing apparatus 200 is constituted similarly to the lenticular lens sheet manufacturing apparatus 100, except for being equipped with a fixing section 7 in place of the above-described fixing section 4.

The fixing section 7 present in the lenticular lens sheet manufacturing apparatus 200 is equipped with two plate-like heaters 70 and 71 facing with each other with a given interval. The heaters 70 and 71 can use, for example, a ceramic heater.

The transparent substrate having the transparent toner image transferred thereto in the transfer section 2 passes between the two heaters 70 and 71. By this constitution, the transparent toner image formed on the one side of the transparent substrate is heat-melted in a non-contact state and fixed. Thus, a transparent toner layer is formed on the one side of the transparent substrate.

As described above, in the lenticular lens sheet manufacturing apparatus 200 of the present embodiment, the transparent toner image formed on the one side of the transparent substrate is heated in a non-contact state in the fixing section 7, thereby forming the transparent toner layer on the one side of the transparent substrate. Therefore, occurrence of hot offset in the fixing section 7 can be prevented. As a result, the heating temperature in the fixing section 7 can be set to high value, and the fixing section 7 can form a high quality transparent toner layer having a large thickness. Accordingly, the lenticular lens sheet manufacturing apparatus 200 can manufacture a high quality lenticular lens sheet having formed thereon a lens layer having a large thickness.

Figure 6:
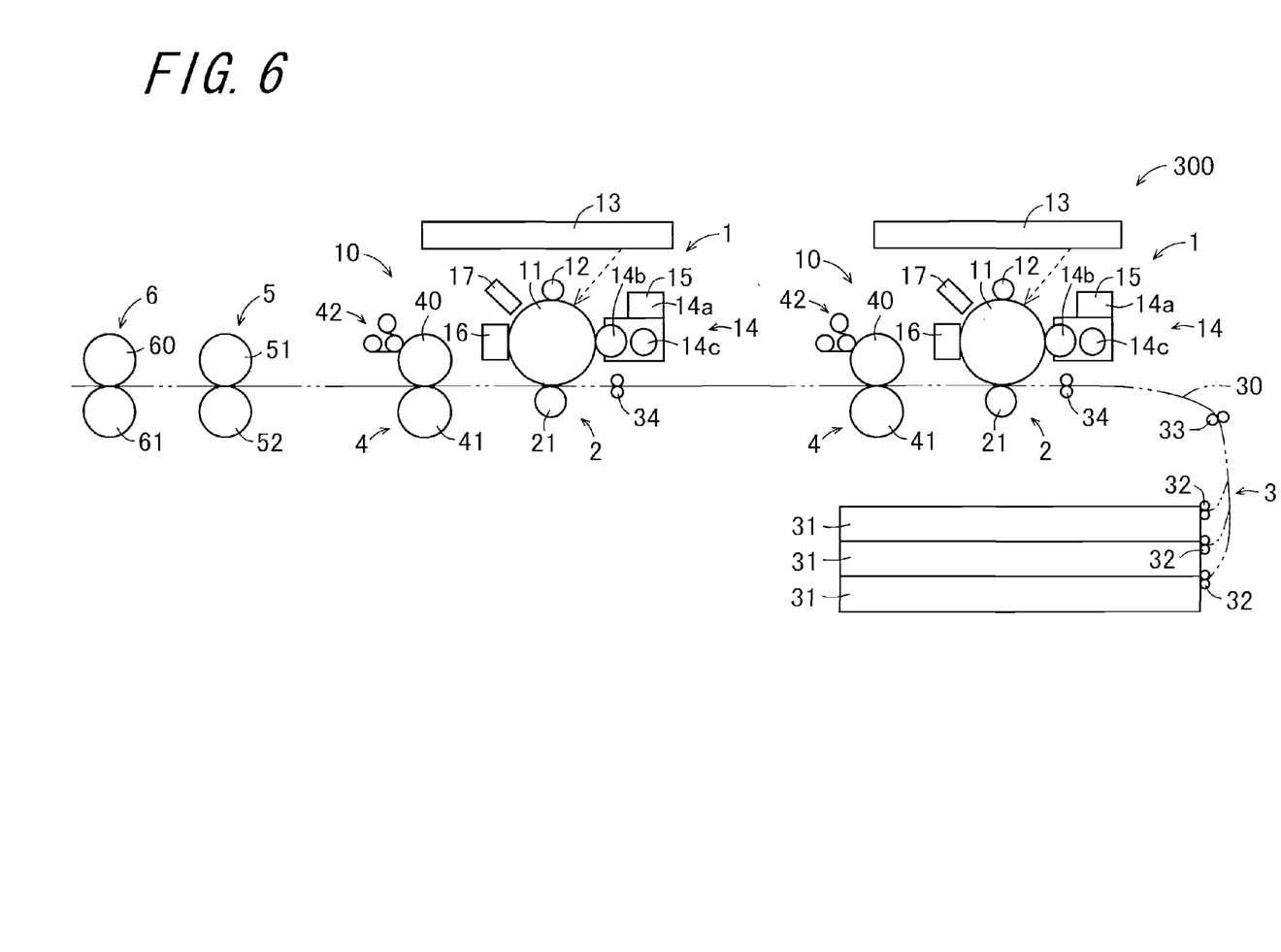
FIG. 6 is a view showing the constitution of a lenticular lens sheet manufacturing apparatus according to a third embodiment.

FIG. 6 is a view showing the constitution of an lenticular lens sheet manufacturing apparatus 300 according to a third embodiment. The lenticular lens sheet manufacturing apparatus 300 according to the present embodiment comprises a plurality of the transparent toner layer forming sections 10 each provided in the lenticular lens sheet manufacturing apparatus 100 of the first embodiment, sequentially forms a transparent toner layer in each transparent toner layer forming section 10, and laminates a plurality of transparent toner layers on the one side of the transparent substrate, thereby forming a transparent toner layer. In the present embodiment, two transparent toner layer forming sections 10 are arranged in series along a conveyance direction of the transparent substrate.

As described above, in the lenticular lens sheet manufacturing apparatus 300 of the present embodiment, a transparent toner layer is formed by laminating a plurality of the transparent toner layers on the one side of the transparent substrate in a plurality of the transparent toner layer forming sections 10. Therefore, transparent toner layers having a relatively small thickness are formed in the transparent toner layer forming sections 10, and these layers are laminated, thereby a transparent toner layer having a large thickness can be formed. Therefore, the heating temperature in the fixing section 4 of each transparent toner layer forming section 10 is set to low value to suppress occurrence of hot offset, and a high quality transparent toner layer having a large thickness can be formed. As a result, the lenticular lens sheet manufacturing apparatus 300 can manufacture a high quality lenticular lens sheet having formed thereon a lens layer having a large thickness.

In the lenticular lens sheet having formed thereon a lens layer having a constant pitch between lenses and a large thickness, that is, a lens layer having high convex portions of a lens, the thickness of the transparent substrate can relatively be decreased. This can reduce load to conveyance-related rollers such as conveying rollers 33, a fixing roller 40 and a lens forming roller 51. This makes it possible to form a lenticular lens sheet having formed thereon a good lens layer in a long life. Groove shape of the lens forming roller 51 is appropriately set so as to obtain a lens layer having a desired thickness.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. A lenticular lens sheet manufacturing apparatus for manufacturing a lenticular lens sheet comprising a transparent substrate and a lens layer formed on one side of the transparent substrate and having a concavo-convex shape, the apparatus comprising:
    a transparent toner layer forming section which forms a transparent toner layer of a transparent toner containing a binder resin on the one side of the transparent substrate, the transparent toner layer forming section comprising:
        an image bearing member;
        a latent image forming section which forms an electrostatic latent image on the image bearing member;
        a developing section which develops the electrostatic latent image formed on the image bearing member with the transparent toner and forms a transparent toner image on the image bearing member;
        a transfer section which transfers the transparent toner image formed on the image bearing member to the one side of the transparent substrate; and
        a fixing section which heats the transparent toner image transferred to the one side of the transparent substrate to fix the transparent toner image, thereby forming a transparent toner layer on the one side of the transparent substrate; and
    a lens forming section which pressurizes under heating the transparent toner layer formed on the one side of the transparent substrate to shape the transparent toner layer into a concavo-convex shape, thereby forming a lens layer having a concavo-convex shape on the one side of the transparent substrate,
    the lens forming section comprising:
        a lens forming roller which includes a heater and is rotationally driven around an axis line thereof;
        a thermistor which detects a surface temperature of the lens forming roller; and
        a lens forming pressure roller which is rotatable in a state of coming into pressure-contact with the lens forming roller,
        wherein, when the surface temperature of the lens forming roller is T° C. and a peripheral velocity of the lens forming roller is V mm/sec, the lens forming section controls electric power to be supplied to the heater and the peripheral velocity of the lens forming roller such that T/V is within a range from 3.3 to 10.7.

2. The lenticular lens sheet manufacturing apparatus of claim 1, wherein the fixing section heats the transparent toner image transferred to the one side of the transparent substrate in a non-contact state and forms the transparent toner layer on the one side of the transparent substrate.

3. The lenticular lens sheet manufacturing apparatus of claim 1, comprising a plurality of the transparent toner layer forming sections, wherein the lenticular lens sheet manufacturing apparatus sequentially forms the transparent toner layers in each transparent toner layer forming section, and laminates a plurality of the transparent toner layers on the one side of the transparent substrate, thereby forming a transparent toner layer.

4. The lenticular lens sheet manufacturing apparatus of claim 3, wherein the plurality of the transparent toner layer forming sections are arranged in series.

\* \* \* \* \*